United States Patent Office 3,231,955
Patented Feb. 1, 1966

3,231,955
WATER HOSE NOZZLE CLAMP
Jerry C. Taylor, 38A Edison Villa, Stockton, Calif.
Filed Aug. 6, 1964, Ser. No. 387,851
1 Claim. (Cl. 24—279)

This invention relates to clamps and the like for use on hoses.

It is an object of the present invention to provide a water hose nozzle clamp which will provide an easy means for securing and removing the nozzle from water faucets.

Another object of the present invention is to provide a water hose nozzle clamp which will have two approximately semicircular sections having teeth on the interior to grippingly engage the hose nozzle.

A further object of the present invention is to provide a water hose nozzle clamp which will have oppositely opposed handles to provide handle grip means for easily rotating and removing the nozzle from the faucet or providing easy means for securing the nozzle to the faucet.

Other objects of the invention are to provide a water hose nozzle clamp bearing the above objects in mind which is of simple construction, has a minimum number of parts, is inexpensive to manufacture and efficient in operation and use.

For other objects and for a better understanding of the invention, reference may be had to the following detailed description taken in conjunction with the accompanying drawing, in which.

Figure 1:
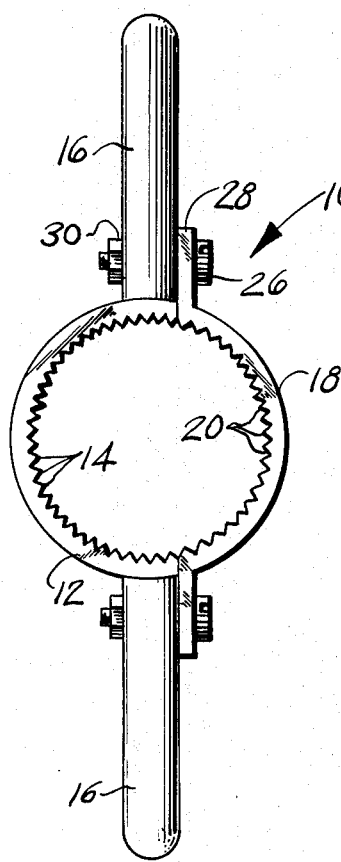
FIGURE 1 is a front view of a clamp comprising the present invention.
Figure 2:
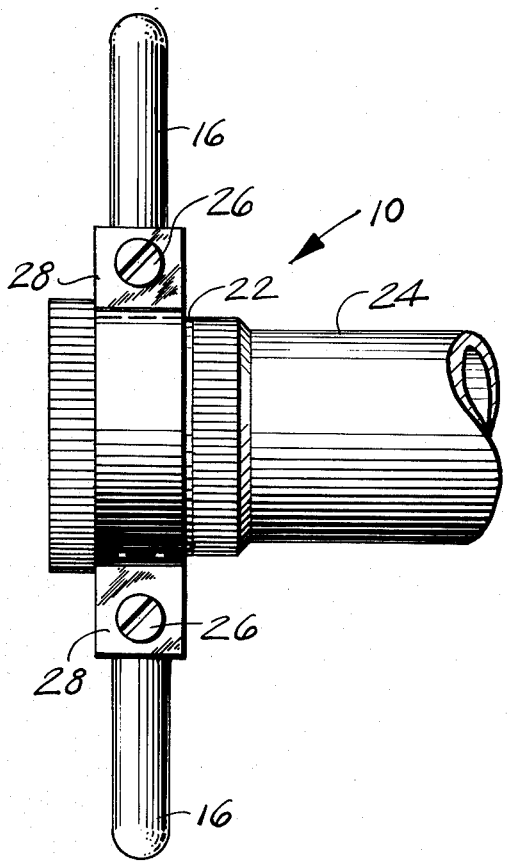
FIGURE 2 is a side view of FIGURE 1 shown in operative use.

Referring now more in detail to the drawing, a water hose nozzle clamp 10 made in accordance with the present invention is shown to include a first arcuate member 12 made of metal or other suitable material having a plurality of teeth 14 spaced apart along the interior thereof. A pair of oppositely opposed handles 16 are fixedly secured to first arcuate member 12 and provide handle grip means for rotating clamp 10. A second arcuate member 18 made of metal or other suitable material is provided with a plurality of spaced apart internal teeth 20 and teeth 14 and 20 of members 12 and 18 respectively provide a means for grippingly engaging the outer periphery of nozzle 22 of hose 24. A pair of threaded bolts 26 are freely received through oppositely opposed extensions 28 of member 18 and are freely received transversely through handles 16 and threadingly receive nuts 30 to secure member 18 to member 12 around the outer periphery of nozzle 22.

In use, nozzle 22 is secured to a faucet (not shown) by gripping the handles 16 and rotating them to thread nozzle 22 onto the faucet.

To remove nozzle 22 from the faucet, handles 16 are gripped in the hands and rotated in the opposite direction to unthread the nozzle 22 from the faucet.

It shall be noted that teeth 14 and 20 of members 12 and 18 respectively grippingly engage the outer periphery of nozzle 22 to prevent clamp 10 from slipping when removing or securing nozzle 22 of hose 24 to or from the faucet.

While various changes may be made in the detail construction, it shall be understood that such changes shall be within the spirit and scope of the present invention as defined by the appended claim.

What I claim as new and desire to protect by Letters Patent of the United States is:

A water hose nozzle clamp comprising in combination a first arcuate member, a pair of oppositely opposed handles integral with said first arcuate member providing handle grip means for rotating said clamp, a second arcuate member carried by said first arcuate member, said first arcuate member having a circular length greater than semi-conductor, said second arcuate member having a circular length less than semi-circular, said first arcuate member and said second arcuate member together forming a full circular configuration and providing a means for encircling and gripping the outer periphery of a nozzle of a hose, said first arcuate member forming the main body of said clamp and being provided with a plurality of spaced apart internal teeth, said teeth providing a means for biting into the outer periphery of said nozzle of said water hose, said handles being diametrically apart and in alignment with each other and extending radially outwardly and being secured to the ends of said first arcuate member and providing handle grip means for rotating said lamp to secure it or remove it from a faucet, said second arcuate member being provided with a plurality of spaced apart teeth internally thereof to grippingly engage in conjunction with said first arcuate member said nozzle of said hose, said second arcuate member having integral oppositely opposed extensions, said extensions being formed at the terminal ends of said second arcuate member and being in alignment with each other and resting against said handles of said first arcuate member, a pair of threaded bolts freely received through said extensions of said second arcuate member and being freely received within openings of said handles and said bolts threadingly receiving nuts to secure said second arcuate member to said first arcuate member.

References Cited by the Examiner
UNITED STATES PATENTS

| 1,639,177 | 8/1927 | Gourley | 81—53 |
| 1,778,576 | 10/1930 | Walker. | |
| 1,838,278 | 12/1931 | Montagnon | 81—90 |
| 2,394,808 | 2/1946 | Rohr | 81—90 |
| 2,847,888 | 8/1958 | Paulson | 81—90 |

FOREIGN PATENTS 808     1893     Great Britain.

WILLIAM FELDMAN, *Primary Examiner.*

MILTON S. MEHR, *Examiner.*